United States Patent [19]
Ohshita

[11] Patent Number: 4,856,880
[45] Date of Patent: Aug. 15, 1989

[54] PHOTO-TAKING LENS FOR AN UNDERWATER CAMERA

[75] Inventor: Koichi Ohshita, Kawasaki, Japan
[73] Assignee: Nikon Corporation, Tokyo, Japan
[21] Appl. No.: 221,201
[22] Filed: Jul. 19, 1988

[30] Foreign Application Priority Data

Jul. 27, 1987 [JP] Japan .................................. 62-186919

[51] Int. Cl.$^4$ ............................................ G02B 13/04
[52] U.S. Cl. ...................................... 350/418; 350/462
[58] Field of Search ................................ 350/418, 462

[56] References Cited

FOREIGN PATENT DOCUMENTS

| 0067715 | 5/1980 | Japan | 350/462 |
|---|---|---|---|
| 56-14211 | 2/1981 | Japan . | |
| 59-13210 | 1/1984 | Japan . | |

*Primary Examiner*—Bruce Y. Arnold
*Assistant Examiner*—Rebecca D. Gass
*Attorney, Agent, or Firm*—Shapiro and Shapiro

[57] ABSTRACT

A photo-taking lens of a two-unit, five element construction for an underwater camera comprises, in succession from the object side, a fixed forward unit having a first element having a meniscus lens having its convex surface facing the object side and having a negative refractive power when the medium on the object side is water, and a rearward unit having a positive second element having a biconvex positive lens, a negative third element having a biconcave negative lens, a positive fourth element having a positive meniscus lens having its convex surface facing the image side, and a positive fifth element having a positive lens having its surface of sharper curvature facing the image side, and movable as a whole along the optic axis for focussing. The photo-taking lens satisfies the following condition:

$$0.75f < r_2 < 2f,$$

where f is the rearward focal length of the entire system during focusing at infinity when the medium on the object side is water, and $r_2$ is the radius of curvature of that surface of the first element which is adjacent to the image side.

8 Claims, 2 Drawing Sheets

PHOTO-TAKING LENS FOR AN UNDERWATER CAMERA

BACKGROUND OF THE INVENTION

1. Field of the Invention

This invention relates to a photo-taking lens having an angle of view of the order of 60° and having a long back focal length, and in particular to a lens for an underwater camera used for underwater photography.

2. Related Background Art

Since a single-lens reflex camera eliminates the problem of parallax and permits its focus to be easily adjusted, attempts to make underwater cameras into single-lens reflex cameras have recently been made. To enable a lens for an underwater camera to be used for a single-lens reflex camera, it is course necessary to make the lens into a construction which can secure a long back focal length. So, to secure a long back focal length in a lens for underwater use as well, the lens is constructed into the heretofore known retrofocus type lens.

When an ordinary retrofocus type lens having an excellent imaging performance in photography in the air and capable of securing a long back focal length is used as a lens for underwater photography, the refractive index of the medium on the object field side varies greatly and therefore aberrations also fluctuate greatly, and it becomes impossible to obtain a sufficient imaging performance. Also, the thickness of the negative lens which is most adjacent to the object side is generally small and therefore, it becomes impossible to neglect influences such as the deformation by water pressure and the like.

On the other hand, there is also known a lens in which a parallel flat plate is disposed on the object field side and is surrounded by a water-proof housing in order that a retrofocus type lens for use in the air may be intactly used for underwater photography. In this case, the focal length and back focal length of that lens during photography in the air do not vary even during underwater photography during which the object field is water, but distortion and chromatic difference of magnification are created by the parallel flat plate inserted forwardly of that lens and fluctuation of aberrations by focusing is also unavoidable.

Lenses for an underwater camera which suppress the fluctuation of aberrations by focusing while having a long back focal length are already known in Japanese Laid-Open Patent Application No. 56-14211 and already Laid-Open Patent Application No. 59-13210. In Japanese Laid-Open Patent Application No. 56-14211, there is proposed a lens in which the center of curvature of the object side surface of a meniscus lens positioned most adjacent to the object side and having its convex surface facing the object side is disposed so as to coincide with the entrance pupil of the entire lens system, whereby off-axis light rays may enter perpendicularly to the object side surface of that lens to thereby make it possible to suppress the variation in the medium on the object field side and the fluctuation of aberrations by focusing. Moreover, in this lens, when the medium on the object field side is water or air, the intergroup spacing is changed to an appropriate spacing in accordance with the medium on the object field side to thereby suppress any fluctuation of the image surface, whereby the lens is made amphibian.

Also, in Japanese Laid-Open Patent Application No. 59-13210, there is proposed a lens exclusively for underwater photography having a long back focal length and yet suppressing the fluctuation of aberrations by focusing and moreover having a wide angle of view of 90°–100°.

In the aforementioned Japanese Laid-Open Patent Application No. 56-14211 and 59-13210, it becomes possible to secure a sufficient back focal length as a lens for a single-lens reflex camera, but the former requires eight elements and ten lenses in two lens units and the latter requires nine elements and ten or more lenses, and this leads to a considerably complicated construction which in turn leads to the problem of manufacturing cost.

Also, in the lens disclosed in Japanese Laid-Open Patent Application No. 56-14211, both the forward unit and the rearward unit are complicated in construction and. Moreover when the medium on the object field side changes from water to air or from air to water, the suitable inter-unit spacing must be changed. Therefore, the focusing mechanism becomes considerably complex. Further, both the aforementioned Japanese Laid-Open Patent Application No. 56-14211 and Japanese Laid-Open Patent Application No. 59-13210 have many movable lenses for focusing and the moving weight becomes great. Therefore, in the case of automatic focusing, it becomes difficult to accomplish quick focusing, and this is not preferable.

Also, in underwater photography, absorption of water for red color is great and scattering of light in the water is great, and this may result in reduced contrast. Further, the fact that underwater photography involves many chances for close-up photography gives rise to the necessity of suppressing the fluctuation of aberrations by short distance focusing.

SUMMARY OF THE INVENTION

Accordingly, it is an object of the present invention to solve the above-noted problems and to provide a lens of high performance for an underwater camera which is of a simple two-unit, five element, construction, and yet has a long back focal length of 1.3f or more and has an F-number 2.8 and an angle of view of the order of 60°, and makes quick focusing possible and yet suppresses the fluctuation of aberrations.

The present invention is of a two-unit five element, construction which comprises, in succession from the object side, a forward unit having a first element which is a meniscus-shaped single lens having its convex surface facing the object side, and a rearward unit having a second element which is a biconvex single lens, a third element which is a biconcave single lens, a fourth element which is a positive meniscus lens having its convex surface facing the image side, and a fifth element which is a positive lens having its surface of sharper curvature facing the image side. The present invention intends to solve the above-noted problems by a construction in which said first element is fixed and said rearward unit is movable as a whole along the optic axis to thereby accomplish focusing and the following condition is satisfied:

$$0.75f < r_2 < 2f,$$

where f is the rearward focal length of the entire system during focusing at infinity when the medium on the object side is water, and $r_2$ is the radius of curvature of that surface of the first element which is adjacent to the image side.

According to the present invention, there can be realized a lens reflex for a single-lens underwater camera which is of a simple two-unit five element construction and yet in which various aberrations are well corrected from infinity to a short distance and in the case of automatic focusing, quick focusing is possible, and which has a sufficiently long back focal length.

Further objects, features, and effects of the present invention will become more fully apparent from the following detailed description taken in conjunction with the accompanying drawings.

DESCRIPTION OF THE PREFERRED EMBODIMENTS

Figure 3:
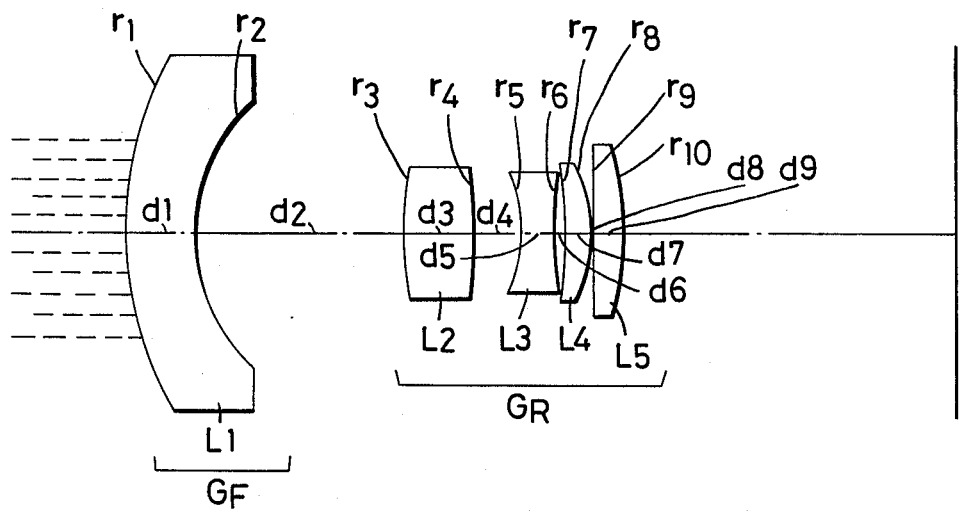
FIG. 3 shows the construction of an optical system according to an embodiment of the present invention.

The present invention, as shown in FIG. 3, is of a two-unit, five-element, construction comprising a forward unit GF consisting of a first element which is a meniscus-shaped single lens L1 having its convex surface facing the object side, and a rearward unit GR having a second element which is a biconvex single lens L2, a third element which is a biconcave single lens L3, a fourth element which is a positive meniscus lens L4 having its convex surface facing the image side, and a fifth element which is a positive lens L5 having its surface of sharper curvature facing the image side. The present invention accomplishes focusing by the forward unit GF being fixed and the rearward unit GR being moved as a whole along the optic axis. In this case, if the rearward focal length of the entire system during focusing at infinity when the medium on the object side is water is f and the radius of curvature of that surface of the first element which is adjacent to the image side is $r_2$, it is necessary to provide a construction which satisfies $$0.75f < r_2 < 2f. \qquad (1)$$

Also, if under the above-mentioned condition, the on-axis spacing between that surface of the first element which is adjacent to the image side and that surface of the second element which is adjacent to the object side during focusing at infinity is $d_2$, it is desirable to provide a construction so as to satisfy.

$$0.8f < d_2 < 3f. \qquad (2)$$

Further, it is desirable that the lens for an underwater camera according to the present invention satisfy the following conditions:

$$1.7 < n_2, n_3, n_4, n_5 \qquad (3)$$

$$58 < \nu_1 \qquad (4)$$

$$0.2f < T < 0.4f \qquad (5)$$

$$0.2f < d_1 < 0.4f \qquad (6)$$

where $n_2$, $n_3$, $n_4$ and $n_5$ are the refractive indices of the second element, the third element, the fourth element and the fifth element, respectively, $\nu_1$ is the Abbe number of the first element, T is the on-axis spacing from that surface of the third element which is adjacent to the image side to that surface of the fifth element which is adjacent to the image side, f is the rearward focal length when the medium in the object field is water, and $d_1$ is the on-axis thickness of the first element.

Now, if the medium on the object side is water, the first lens element which is the meniscus lens L1 having its convex surface facing the object side is weak in the refractive power on the first surface $r_1$ and depends chiefly on the refractive power on the second surface $r_2$, and thus generally has a negative refractive power. Accordingly, during underwater photography, the photo-taking lens of the present invention is a so-called retrofocus type lens for an underwater camera comprising a forward unit GF which is a first element having a negative refractive power, and a rearward unit GR comprised of second to fifth elements and having a positive refractive power.

Here, the meniscus-shaped single lens L1 of the first element which is the forward unit has both the function as a pressure-resisting window and the function as a diverging lens. Moreover, the meniscus shape of the forward unit GF is a shape having high rigidity to a high water, pressure in water and in addition, has a sufficient thickness, and this is advantageous.

On the other hand, with regard to the lens construction in the rearward unit GR of the present invention, it is desirable that it have a positive refractive index as a whole, but have at least one negative lens as viewed from the viewpoint of the correction of curvature of image field. Accordingly, if the rearward unit is of a four-element construction, four kinds of constructions, i.e., negative positive positive positive (I), positive negative positive positive (II), positive positive negative positive (III) and positive positive positive negative (IV), are conceivable as the lens arrangement of the rearward unit. These constructions will first be discussed hereinafter.

First, assuming that in the construction of negative positive positive positive (I), a stop disposed rearwardly of the negative lens which is the second element, the positive lens system rearward of the stop acts to further aggravate chromatic aberration created by the negative lens system forward of the stop. Also, the lens systems forward and rearward of the stop both create negative distortion and therefore, negative distortion becomes very great. Accordingly, in this construction, correction of distortion and chromatic difference of magnification becomes difficult, and this is not preferable.

Also, in the construction of positive positive positive negative (IV), the second to fourth lens elements are lenses of positive refractive power and the fifth lens element is a lens of negative refractive power. Thus this construction assumes the so-called telephoto type arrangement in which the rearward principal point of the rearward unit appears forwardly, namely, on the object side. Therefore, it becomes difficult to secure a long back focal length, and again the construction of positive positive positive negative (IV) is not preferable.

Also, where the rearward unit is of the construction of positive positive negative positive (III), the principal point of this unit tends to incline toward the object side. Here, which for simplicity of description, the forward and rearward units are regarded as thin systems and the refractive power of the forward unit is $\psi_1$ and the refractive power of the rearward unit is $\psi_2$ and the spacing between the forward and rearward units is d, the rearward focal length f and back focal length Bf of the entire system can be expressed as $$f = 1/(\psi_1 + \psi_2 - d\psi_1\psi_2) \quad (a)$$

$$Bf = (1 - d\psi_1)/(\psi_1 + \psi_2 - d\psi_1\psi_2) \quad (b)$$

and after all, can be expressed as $$Bf/f = 1 - d\psi_1. \quad (c)$$

Thereupon, as described above, in this construction, the principal point of the rearward unit moves toward the object side and, therefore, the spacing d between the forward and rearward units in equation (c) decreases and it becomes difficult to secure a long back focal length. From this, to secure the necessary back focal length, the negative refractive power $\psi_1$ of the forward unit, i.e., the first element L1, can be made great, but correction of aberrations becomes difficult.

Also, in the present invention, inward coma occurs particularly in the meniscus lens L1 which is the forward unit GF and, therefore, the rearward unit GR must be made into a construction which is capable of correcting the inward coma occurring in the meniscus lens L1 which is the forward unit. So, the case where the construction of the rearward unit is positive positive negative positive (III) will hereinafter be considered from the viewpoint of aberration correction.

Assuming that a stop is disposed rearwardly of the positive lens which is the second element, the second, third and fourth elements are of a construction which negates the coma occurring in each element and therefore, the inward coma occurring in the forward unit must be corrected by the fifth element. From this, the positive lens which is the fifth element can be made into a shape having its convex surface of sharper curvature facing the image side, to thereby create outward coma, and by keeping balance with the inward coma occurring in the forward unit, coma can be corrected. However, light rays are jumped up by the negative lens which is the fourth elements and moreover, the lens which is the fifth group is of a shape having a convex surface of sharper curvature facing the image side and therefore, high order spherical aberration occurs and it becomes difficult to maintain the brightness of F-number 2.8. Accordingly, from what has been described above, the construction in which the rearward unit is positive positive negative positive (III) is neither preferable.

In the lens construction wherein the rearward unit is positive negative positive positive (II), the principal point of this unit tends to move toward the image side and therefore, from formula (3), it becomes possible to keep the spacing d between the forward and rearward units large, and the refractive power $\psi_1$ of the forward unit can be made small. Accordingly, aberration correction becomes easy.

Considering this construction of positive negative positive positive (II) from the viewpoint of aberration correction, the second and third elements in the rearward unit do not contribute to coma, but by making the positive lenses which are the fourth and fifth elements into a shape having its surface of sharper curvature facing the image side, there can be provided a construction which can correct the inward coma occurring in the forward unit GF. Moreover, coma can be shared and corrected by the positive lenses which are the fourth and fifth elements and, therefore, the curvature of each of the surfaces of the fourth and fifth elements can be weakened. Moreover, it becomes possible to suppress high order spherical aberration occurring in the fourth and fifth elements, and the brightness of F-number 2.8 can be maintained.

Further, negative distortion occurring in the first element L1, the fourth element L4 and the fifth element L5 can be corrected by the second element L2, and the Petzval sum can be made approximate to an appropriate value by the third element L3 and therefore, the best image surface can be kept.

Accordingly, from what has been described above, it is most preferable to adopt the construction of positive negative positive positive (II) for the rearward elements.

Also, the present invention adopts a system in which the first element L1 is fixed and the second element L2 and subsequent elements are axially moved toward the object side to thereby accomplish focusing as focusing is effected from infinity to a short distance. By this focusing method, simplification of the water-proof structure can be achieved, and the number of movable elements for focusing is small and their movement is simple; and in the case of automatic focusing, focusing to a shorter distance can be quickly accomplished.

Figure 2A:
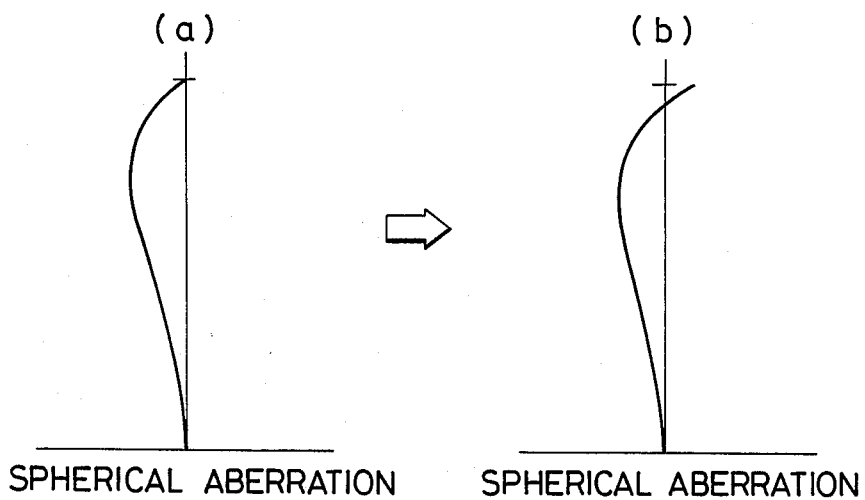
FIG. 2A illustrates the difference between the spherical aberration when the lens of FIG. 1 is totally axially moved and the spherical aberration when the rearward unit is axially moved.
Figure 2B:
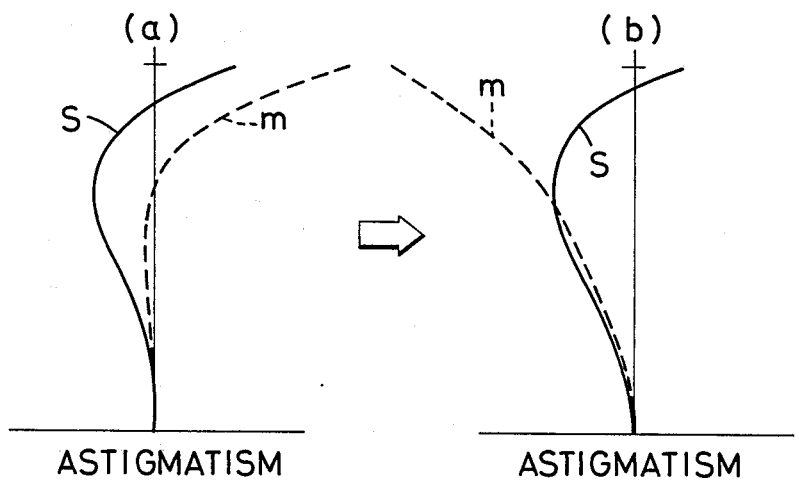
FIG. 2B illustrates the difference between the astigmatism when the lens of FIG. 1 is totally axially moved and the astigmatism when the rearward unit is axially moved.

FIG. 2A shows the difference between the spherical aberrations during close-up photography by the total movement focusing and the rearward unit movement focusing, and FIG. 2B shows the difference between the astigmatisms during close-up photography by the all-elements movement focusing and the rearward unit movement focusing. As shown by (a) in FIG. 2A, in the total movement, spherical aberration is suppressed, while as shown by (a) in FIG. 2B, the curvature of image field (indicated by broken line m) of the meridional plane of astigmatism occurs in the positive direction. On the other hand, in the focusing method which is the rearward unit movement, generally as shown by (b) in FIG. 2A, spherical aberration tends to move in the positive direction, and as shown by (b) in FIG. 2B, the curvature of image field m of the meridinal plane of astigmatism tends to move in the negative direction.

Figure 1:
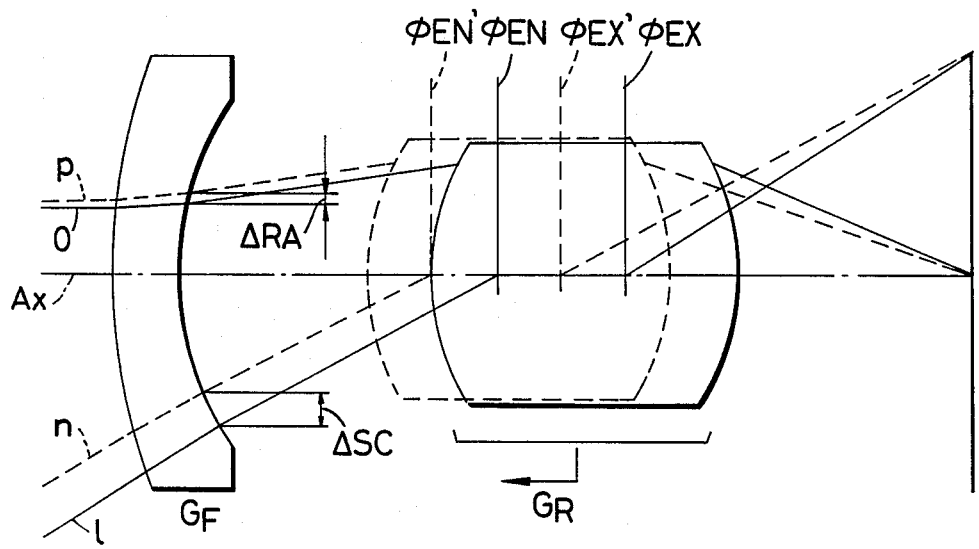
FIG. 1 is an illustration for qualitatively explaining the fluctuation of aberrations in a retrofocus type lens for an underwater camera focused by axial movement of a rearward unit.

The fluctuations of the spherical aberration and the curvature of image field of the meridional plane created by effecting short distance focusing by the rearward unit movement will be explained hereinafter with reference to FIG. 1. FIG. 1 qualitatively shows the aberration fluctuation caused by the focusing of a rearward unit movement retrofocus type lens for an underwater camera similar to the present invention. As shown in FIG. 1, in the case of the focusing by the rearward unit movement, the principal ray incident on the forward unit GF at the entrance pupil $\phi$EN at a full angle of view as indicated by solid line l and emerging from the exit pupil $\phi$EX comes near the optic axis by $\Delta$SC when the rearward unit GR is moved toward the object side by short distance focusing, and enters, as the principal ray indicated by dotted line n, the entrance pupil $\phi'EN$ of the rearward unit after being moved. Therefore, the effect of the divergence of the negative lens GF which is the forward unit weakens and the curvature of image field of the positive meridional plane created by the negative lens GF decreases. Accordingly, the correction by the rearward unit becomes excessive and the aberration of the curvature of image field of the meridional plane by short distance focusing moves in the minus direction as indicated by broken line m in FIG. 2B. On the other hand, by the rearward unit GR being moved toward the object side for the purpose of short distance focusing, the light ray parallel to the optic axis as indicated by solid line o in FIG. 1 and incident on the forward unit GF at the greatest incidence height (so-called land ray of the greatest incidence height) enters the forward unit GF as the land ray indicated by dotted line p and therefore, the action of the divergence of the negative lens which is the forward unit GF increases with an increase in the amount of variation $\Delta RA$ in the incidence height, and the positive spherical aberration occurring therein also increases. Accordingly, the spherical aberration by short distance focusing moves in the plus direction as shown in FIG. 2B.

Thus, in the retrofocus-type lens of the rearward unit movement focusing system in which aberrations occur, it is not easy for such optical system, having a small degree of freedom in aberration correction, to accomplish aberration correction by a simple construction and, moreover sufficiently while securing a long back focal length. Therefore, in the present invention, it is necessary to construct the lens so as to satisfy the aforementioned conditions (1) and (2) particularly, condition (1). Conditions (1) and (2) are conditions for providing the balance for suppressing the fluctuations of the various aberrations caused by said rearward unit movement and well correcting the various aberrations at the standard photographing distance. The standard photographing distance herein referred to is a distance of the order of 2-5 m because this lens is for underwater use. Conditions (1) and (2) will be described hereinafter.

Condition (1) prescribes the radius of curvature of the image side surface $r_2$ of the first element. This is a condition for suppressing the fluctuation of spherical aberration and is also a condition for keeping an appropriate back focal length and well correcting the spherical aberration at the standard photographing distance. If $r_2$ becomes greater, the diverging action on that surface, $r_2$ becomes smaller and the amount of variation in spherical aberration corresponding to the amount of variation $\Delta RA$, which is the variation in the incidence height in the meridional plane of the surface $r_2$ by focusing, can be suppressed to a relatively small value. Accordingly, from the viewpoint of suppressing the fluctuation of spherical aberration, it is desired to make $r_2$ great. However, if the upper limit of condition (1) is exceeded, the refractive power of the first element which is the forward unit of the retrofocus lens will be weakened and, therefore, it will become difficult to keep a long back focal length. Also, positive spherical aberration occurring in the first element will remarkably decrease and thus, it will become impossible that the positive spherical aberration occurring in the first element and the negative spherical aberration created by the positive lens in the rearward unit are offset by each other. Therefore, spherical aberration will be under-corrected.

From this, if the refractive power of the negative lens which is the third element is increased to correct spherical aberration in the plus direction, it will become difficult due to high order spherical aberration occurring therein to maintain the brightness of F-number 2.8. Also, if the lower limit of condition (1) is exceeded, the diverging action on the surface $r_2$ will become great and the amount of variation in spherical aberration for the variation $\Delta RA$ which is a variation in the incidence height in the meridional plane by focusing will become great. Accordingly, it will become difficult to suppress the fluctuation of spherical aberration caused by focusing. Accordingly, it is necessary to satisfy condition (1).

Condition (2) is a condition for suppressing the fluctuation of the curvature of image field in the meridional plane caused by the diverging action of the principal ray incident on the first element at a full angle of view by the surface $r_2$, by focusing, and also suppressing the fluctuation of coma caused by focusing, and is also a condition for well correcting the distortion and astigmatism at the standard photographing distance. If the upper limit of condition (2) is exceeded, it will be advantageous for suppressing the fluctuation of coma during short distance photography. However, the fluctuation of the image surface by focusing during close-up photography will tend to move in the minus direction, and this is not preferable. Also, since the contribution of the first element is great, negative distortion will become great at the standard distance, and this is not preferable. Further, if the lower limit of condition (2) is exceeded, correction of negative curvature of image field at the standard distance will be difficult, and the image surface during close-up photography will move too much in the plus direction, and occurrence of outward coma during close-up photography will become great. Accordingly, to correct the above-mentioned aberrations by a lens construction using a small number of lenses, it is desirable to satisfy condition (1) as described above and further satisfy condition (2).

In the lens of the negative, positive, negative, positive, positive two-unit, construction of the present invention, it is desirable to further satisfy the following conditions:

$$1.7 < n_2, n_3, n_4, n_5 \tag{3}$$

$$58 < \nu_1 \tag{4}$$

$$0.2f < T < 0.4f \tag{5}$$

$$0.2f < d_1 < 0.4f \tag{6}$$

where $n_2$, $n_3$, $n_4$, and $n_5$ are the refractive indices of the second element, the third element, the fourth element and the fifth element, respectively, $\nu_1$ is the Abbe number of the first element, T is the on-axis spacing between the image side surface of the third element and the image side surface of the fifth element, f is the rearward focal length when the medium in the object field is water, and $d_1$ is the on-axis thickness of the first element.

Condition (3) prescribes the refractive index of the rearward unit. As previously described, in the lens of the present invention, positive spherical aberration occurring in the first lens element is small, and the burden applied to the negative lens which is the third element is great. So, it is desirable that $1.7 < n_3$. Further, to make the Petzval sum into an appropriate value and keep the best image surface, it is necessary to keep the refractive indices of the positive lens elements in the rearward unit high, and it is desirable that $1.7 < n_2, n_4, n_5$.

Condition (4) prescribes the dispersion of the first element. In the lens of the present invention, the first element which is the forward unit is comprised of a single lens and and, therefore fluctuation of chromatic aberration by focusing occurs; but if condition (4) is satisfied, fluctuation of chromatic difference of magnification can be suppressed to a sufficiently small value.

Condition (5) prescribes appropriate correction of coma and distortion. If the lower limit of this condition is exceeded, correction of inward coma occurring in the first element will become insufficient, and the distortion during close-up photography will be significant. Conversely, if the upper limit of this condition is exceeded, correction of the negative distortion during infinity will become difficult, and this is not preferable.

Condition (6) prescribes the on-axis thickness of the first element. If viewed in terms of aberrations, when substantially $d_1 = 0.3f$, the aberrations occurring in the first element become minimum. From this, the on-axis thickness of the first element must be determined within the range of about $0.3f$. First, the on-axis thickness of the first element must withstand the high water pressure in the water, and need be a thickness of at least $0.2f$. Also, in practice, too great an on-axis thickness would pose a problem and, therefore the on-axis thickness must not exceed the upper limit $0.4f$. Accordingly, it is desirable to construct the lens so as to satisfy condition (6).

Some embodiments of the present invention will be shown below.

FIG. 3 shows the construction of Embodiments 1 to 5 of the present invention. The specific construction of each of Embodiments 1 to 5 is a retrofocus-type lens of a two-unit five-element construction comprising, in the water, in succession from the object side, a forward unit GF consisting of a first element which is a meniscus lens L1 having its convex surface facing the object side, and a rearward unit GR comprised of a second element which is a biconvex positive lens L2, a third element which is a negative lens 13, a fourth element which is a positive meniscus lens L4 having its convex surface facing the image side and a fifth element which is a positive lens L5 having its surface of sharper curvature facing the image side, and having a positive refractive power as a whole.

The numerical data of the respective embodiments of the present invention will be shown in Tables 1 to 5 below. In the tables, the radius of curvature is r, the inter-surface spacing is d, the refractive index is n, and the Abbe number is $\nu$, the refractive index n and the Abbe number $\nu$ being for d-line ($\lambda = 586.7$ mm) as the standard wavelength, and the refractive index of water which is the medium on the object side is $n_W = 1.33306$, and the Abbe number of water is $\nu_W = 53.98$. Also, the lens of the present invention is supposed to be used in water as the medium in the object field, but of course is intactly applicable in other liquid media having a refractive index approximate to that of water, such as sea water or ethyl alcohol.

TABLE 1

| | (Embodiment 1) | | | |
|---|---|---|---|---|
| No. | Radius of curvature r | Center thickness & space d | Refractive index n | Abbe number $\nu$ |
| 1 | 139.860 | 27.972 | 1.51680 | 64.12 |
| 2 | 76.720 | (variable) | | |
| 3 | 115.052 | 27.972 | 1.78797 | 47.53 |
| 4 | −260.518 | 18.881 | | |
| 5 | −63.058 | 13.986 | 1.74077 | 27.64 |
| 6 | 242.556 | 3.497 | | |
| 7 | −189.247 | 9.790 | 1.74810 | 52.06 |
| 8 | −75.243 | 1.399 | | |
| 9 | 2840.127 | 12.587 | 1.74443 | 49.53 |
| 10 | −95.677 | Bf = variable | | |

Focal length f = 100.0 Angle of view $2\omega = 59.4°$

| | Infinity | Photographing magnification 1/30 |
|---|---|---|
| $d_2$ | 83.916 | 79.159 |
| Bf | 134.616 | 139.372 |

$r_2 = 0.767f$, $d_2 = 0.839f$
$n_2 = 1.78797$, $n_3 = 1.74077$, $n_4 = 1.74810$,
$n_5 = 1.74443$
$\nu_1 = 64.12$, $T = 0.2727f$
$d_1 = 0.280f$

TABLE 2

| | (Embodiment 2) | | | |
|---|---|---|---|---|
| No. | Radius of curvature r | Center thickness & space d | Refractive index n | Abbe number $\nu$ |
| 1 | 139.866 | 27.973 | 1.51680 | 64.12 |
| 2 | 85.340 | (variable) | | |
| 3 | 110.445 | 27.973 | 1.77279 | 49.44 |
| 4 | −275.581 | 18.882 | | |
| 5 | −64.063 | 13.987 | 1.74077 | 27.64 |
| 6 | 217.112 | 2.797 | | |
| 7 | −132.878 | 9.791 | 1.74810 | 52.06 |
| 8 | −74.036 | 1.399 | | |
| 9 | 891.008 | 12.588 | 1.74443 | 49.53 |
| 10 | −91.777 | Bf = variable | | |

Focal length f = 100.0 Angle of view $2\omega = 59.4°$

| | Infinity | Photographing magnification 1/30 |
|---|---|---|
| $d_2$ | 104.900 | 100.580 |
| Bf | 134.615 | 138.934 |

$r_2 = 0.853f$, $d_2 = 1.049f$
$n_2 = 1.77279$, $n_3 = 1.74077$, $n_4 = 1.74810$,
$n_5 = 1.74443$,
$\nu_1 = 64.12$, $T = 0.2657f$
$d_1 = 0.280f$

TABLE 3

| | (Embodiment 3) | | | |
|---|---|---|---|---|
| No. | Radius of curvature r | Center thickness & space d | Refractive index n | Abbe number $\nu$ |
| 1 | 140.093 | 28.019 | 1.51680 | 64.12 |
| 2 | 87.536 | (variable) | | |
| 3 | 107.822 | 24.867 | 1.77279 | 49.44 |
| 4 | −284.393 | 18.563 | | |
| 5 | −64.613 | 12.959 | 1.74000 | 28.27 |
| 6 | 214.835 | 2.452 | | |
| 7 | −338.488 | 12.259 | 1.79668 | 45.42 |
| 8 | −69.280 | 1.401 | | |
| 9 | −527.755 | 11.208 | 1.71300 | 53.97 |
| 10 | −138.115 | Bf = variable | | |

Focal length f = 100.0, Angle of view $2\omega = 59.4°$

| | Infinity | Photographing magnification 1/30 |
|---|---|---|
| $d_2$ | 126.087 | 121.847 |
| Bf | 134.608 | 138.843 |

TABLE 3-continued (Embodiment 3)

| $r_2 = 0.875f$, | $d_2 = 1.261f$ | |
| $n_2 = 1.77279$, | $n_3 = 1.74000$, | $n_4 = 1.79668$, |
| $n_5 = 1.71300$ | | |
| $\nu_1 = 64.12$, | $T = 0.2732f$ | |
| $d_1 = 0.280f$ | | |

TABLE 4

(Embodiment 4)

| No. | Radius of curvature r | Center thickness & space d | Refractive index n | Abbe number $\nu$ |
|---|---|---|---|---|
| 1 | 139.861 | 27.972 | 1.51680 | 64.12 |
| 2 | 100.564 | (variable) | | |
| 3 | 115.424 | 27.972 | 1.78797 | 47.53 |
| 4 | −312.286 | 18.881 | | |
| 5 | −66.261 | 13.986 | 1.74077 | 27.64 |
| 6 | 219.726 | 3.497 | | |
| 7 | −130.801 | 9.441 | 1.77279 | 49.44 |
| 8 | −77.225 | 1.399 | | |
| 9 | 1465.567 | 12.588 | 1.74810 | 52.06 |
| 10 | −91.939 | Bf = variable | | |

Focal length f = 100.0, Angle of view $2\omega = 59.6°$

| | Infinity | Photographing magnification 1/30 |
|---|---|---|
| $d_2$ | 139.862 | 135.946 |
| Bf | 134.616 | 138.532 |

| $r_2 = 1.006f$, | $d_2 = 1.399f$ | |
| $n_2 = 1.78797$, | $n_3 = 1.74077$, | $n_4 = 1.77279$, |
| $n_5 = 1.74810$ | | |
| $\nu_1 = 64.12$, | $T = 0.2693f$ | |
| $d_1 = 0.280f$ | | |

TABLE 5

(Embodiment 5)

| No. | R | D | Abbe N | N (D) |
|---|---|---|---|---|
| 1 | 139.8557 | 27.9702 | 64.12 | 1.51680 |
| 2 | 87.3790 | (variable) | | 1.0 |
| 3 | 116.8208 | 25.1732 | 47.53 | 1.78797 |
| 4 | −265.0589 | 18.5303 | | 1.0 |
| 5 | −66.7478 | 13.6355 | 28.27 | 1.74000 |
| 6 | 227.0467 | 3.1428 | | 1.0 |
| 7 | −235.9388 | 10.4888 | 49.44 | 1.77279 |
| 8 | −81.1284 | 1.3985 | | 1.0 |
| 9 | −697.7879 | 12.2370 | 53.97 | 1.71300 |
| 10 | −94.7970 | Bf = variable | | 1.0 |

Focal length f = 100.0, Angle of view $2\omega = 59.8°$

| | Infinity | Photographing magnification 1/30 X |
|---|---|---|
| $d_2$ | 125.866 | 121.623 |
| Bf | 139.390 | 143.633 |

| $r_2 = 0.874f$, | $d_2 = 1.259f$ | |
| $n_2 = 1.78797$, | $n_3 = 1.74000$, | $n_4 = 1.77279$ |
| $n_5 = 1.71300$ | | |
| $\nu_1 = 64.12$, | $T = 0.2727f$ | |
| $d_1 = 0.280f$ | | |

In each embodiment of the present invention, good aberration correction is accomplished for infinity to a short distance of photographing magnification 1/30 while a sufficiently long back focal length (Bf) is maintained.

As described above, according to the present invention, there can be realized a lens for a single-lens reflex underwater camera in which, in spite of a simple two-unit, five-element, construction, various aberrations are well corrected for infinity to a short distance and, quick automatic focusing is possible because of the small weight of the movable portion during focusing and moreover, which has a sufficiently long back focal length.

What is claimed is:

1. A photo-taking lens of a two-unit construction for an underwater camera comprising, in succession from the object side, a fixed forward unit having a first element having a meniscus lens having its convex surface facing the object side and having a negative refractive power when the medium on the object side is water, and a rearward unit having a positive second element having a biconvex positive lens, a negative third element having a biconcave negative lens, a positive fourth element having a positive meniscus lens having its convex surface facing the image side, and a positive fifth element having a positive lens having its surface of sharper curvature facing the image side, and movable as a whole along the optic axis for focusing, characterized in that said photo-taking lens satisfies the following condition:

$$0.75f < r_2 < 2f,$$

where f is the rearward focal length of the entire system during focusing at infinity when the medium on the object side is water, and $r_2$ is the radius of curvature of that surface of said first element which is adjacent to the image side.

2. A photo-taking lens for an underwater camera according to claim 1, further characterized in that said photo-taking lens satisfies the following condition:

$$0.8f < d_2 < 3f,$$

where $d_2$ is the on-axis spacing between that surface of said first element which is adjacent to the image side and that surface of said second element which is adjacent to the object side during focusing at infinity.

3. A photo-taking lens for an underwater camera according to claim 2, further characterized in that said photo-taking lens satisfies the following conditions:

$$1.7 < n_2, n_3, n_4, n_5$$

$$58 < \nu_1$$

$$0.2f < T < 0.4f$$

$$0.2f < d_1 < 0.4f$$

where $n_2$, $n_3$, $n_4$, and $n_5$ are the refractive indices of said second, third, fourth and fifth elements, respectively, $\nu_1$ is the Abbe number of said first element, T is the on-axis spacing from that surface of said third element which is adjacent to the image side to that surface of said fifth element which is adjacent to the image side, and $d_1$ is the on-axis thickness of said first element.

4. A photo-taking lens for an underwater camera according to claim 1, characterized by the following data:

| No. | Radius of curvature r | Center thickness & space d | Refractive index n | Abbe number $\nu$ |
|---|---|---|---|---|
| 1 | 139.860 | 27.972 | 1.51680 | 64.12 |
| 2 | 76.720 | (variable) | | |
| 3 | 115.052 | 27.972 | 1.78797 | 47.53 |
| 4 | −260.518 | 18.881 | | |
| 5 | −63.058 | 13.986 | 1.74077 | 27.64 |
| 6 | 242.556 | 3.497 | | |

-continued

| | | | |
|---|---|---|---|
| 7 | −189.247 | 9.790 | 1.74810 | 52.06 |
| 8 | −75.243 | 1.399 | | |
| 9 | 2840.127 | 12.587 | 1.74443 | 49.53 |
| 10 | −95.677 | Bf = variable | | |

Focal length f = 100.0, Angle of view 2ω = 59.4°

| | Infinity | Photographing magnification 1/30 |
|---|---|---|
| d₂ | 83.916 | 79.159 |
| Bf | 134.616 | 139.372 |

5. A photo-taking lens for an underwater camera according to claim 1, characterized by the following data:

| No. | Radius of curvature r | Center thickness & space d | Refractive index n | Abbe number ν |
|---|---|---|---|---|
| 1 | 139.866 | 27.973 | 1.51680 | 64.12 |
| 2 | 85.340 | (variable) | | |
| 3 | 110.445 | 27.973 | 1.77279 | 49.44 |
| 4 | −275.581 | 18.882 | | |
| 5 | −64.063 | 13.987 | 1.74077 | 27.64 |
| 6 | 217.112 | 2.797 | | |
| 7 | −132.878 | 9.791 | 1.74810 | 52.06 |
| 8 | −74.036 | 1.399 | | |
| 9 | 891.008 | 12.588 | 1.74443 | 49.53 |
| 10 | −91.777 | Bf = variable | | |

Focal length f = 100.0, Angle of view 2ω = 59.4°

| | Infinity | Photographing magnification 1/30 |
|---|---|---|
| d₂ | 104.900 | 100.580 |
| Bf | 134.615 | 138.934 |

6. A photo-taking lens for an underwater camera according to claim 1, characterized by the following data:

| No. | Radius of curvature r | Center thickness & space d | Refractive index n | Abbe number ν |
|---|---|---|---|---|
| 1 | 140.093 | 28.019 | 1.51680 | 64.12 |
| 2 | 87.536 | (variable) | | |
| 3 | 107.822 | 24.867 | 1.77279 | 49.44 |
| 4 | −284.393 | 18.563 | | |
| 5 | −64.613 | 12.959 | 1.74000 | 28.27 |
| 6 | 214.835 | 2,452 | | |
| 7 | −338.488 | 12.259 | 1.79668 | 45.42 |
| 8 | −69.280 | 1.401 | | |
| 9 | −527.755 | 11.208 | 1.71300 | 53.97 |
| 10 | −138.115 | Bf = variable | | |

Focal length f = 100.0, Angle of view 2ω = 59.4°

| | Infinity | Photographing magnification 1/30 |
|---|---|---|
| d₂ | 126.087 | 121.847 |
| Bf | 134.608 | 138.843 |

7. A photo-taking lens for an underwater camera according to claim 1, characterized by the following data:

| No. | Radius of curvature r | Center thickness & space d | Refractive index n | Abbe number ν |
|---|---|---|---|---|
| 1 | 139.861 | 27.972 | 1.51680 | 64.12 |
| 2 | 100.564 | (variable) | | |
| 3 | 115.424 | 27.972 | 1.78797 | 47.53 |
| 4 | −312.286 | 18.881 | | |
| 5 | −66.261 | 13.986 | 1.74077 | 27.64 |
| 6 | 219.726 | 3.497 | | |
| 7 | −130.801 | 9.441 | 1.77279 | 49.44 |
| 8 | −77.225 | 1.399 | | |
| 9 | 1465.567 | 12.588 | 1.74810 | 52.06 |
| 10 | −91.939 | Bf = variable | | |

Focal length f = 100.0, Angle of view 2ω = 59.4°

| | Infinity | Photographing magnification 1/30 |
|---|---|---|
| d₂ | 139.862 | 135.946 |
| Bf | 134.616 | 138.532 |

8. A photo-taking lens for an underwater camera according to claim 1, characterized by the following data:

| No. | R | D | Abbe N | N (D) |
|---|---|---|---|---|
| 1 | 139.8557 | 27.9702 | 64.12 | 1.51680 |
| 2 | 87.3790 | (variable) | | 1.0 |
| 3 | 116.8208 | 25.1732 | 47.53 | 1.78797 |
| 4 | −265.0589 | 18.5303 | | 1.0 |
| 5 | −66.7478 | 13.6355 | 28.27 | 1.74000 |
| 6 | 227.0467 | 3.1428 | | 1.0 |
| 7 | −235.9388 | 10.4888 | 49.44 | 1.77279 |
| 8 | −81.1284 | 1.3985 | | 1.0 |
| 9 | −697.7879 | 12.2370 | 53.97 | 1.71300 |
| 10 | −94.7970 | Bf = variable | | 1.0 |

Focal length f = 100.0, Angle of view 2ω = 59.8°

| | Infinity | Photographing magnification 1/30 X |
|---|---|---|
| d₂ | 125.866 | 121.623 |
| Bf | 139.390 | 143.633 |

* * * * *